United States Patent
Shimodaira

(10) Patent No.: US 11,059,181 B2
(45) Date of Patent: Jul. 13, 2021

(54) CONTROL APPARATUS, ROBOT, AND ROBOT SYSTEM

(71) Applicant: Seiko Epson Corporation, Tokyo (JP)

(72) Inventor: Yasuhiro Shimodaira, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 281 days.

(21) Appl. No.: 16/394,593

(22) Filed: Apr. 25, 2019

(65) Prior Publication Data

US 2019/0329423 A1 Oct. 31, 2019

(30) Foreign Application Priority Data

Apr. 26, 2018 (JP) .............................. JP2018-084831

(51) Int. Cl.
*B25J 13/06* (2006.01)
*B25J 9/16* (2006.01)

(52) U.S. Cl.
CPC ............ *B25J 13/06* (2013.01); *B25J 9/1664* (2013.01)

(58) Field of Classification Search
None
See application file for complete search history.

(56) References Cited

U.S. PATENT DOCUMENTS

| | | | | |
|---|---|---|---|---|
| 6,092,004 A * | 7/2000 | Harima | ............... | G05B 19/416 700/252 |
| 2014/0249675 A1* | 9/2014 | Krishnasamy | ......... | B25J 9/1664 700/250 |
| 2014/0297030 A1* | 10/2014 | Iwasaki | ................. | B25J 9/1651 700/245 |
| 2015/0025684 A1* | 1/2015 | Negishi | ................. | B25J 9/1664 700/261 |
| 2016/0008977 A1* | 1/2016 | Nishio | ................... | B25J 9/1664 700/262 |
| 2016/0306369 A1* | 10/2016 | Ueda | ...................... | G05B 11/01 |
| 2016/0361816 A1* | 12/2016 | Sakata | .................... | F16H 21/46 |

FOREIGN PATENT DOCUMENTS

| JP | H10-291183 A | 11/1998 |
|---|---|---|
| JP | 2002-086375 A | 3/2002 |
| JP | 6271288 B2 * | 1/2018 ............ B25J 9/1651 |

OTHER PUBLICATIONS

Antal K. Bejczy "A simple Method for generating smooth robot arm motion"; 6 pages (Year: 2009).*

* cited by examiner

*Primary Examiner* — Kira Nguyen
(74) *Attorney, Agent, or Firm* — Gang Yu

(57) ABSTRACT

A robot system includes: a robot having a robot arm; a robot controller configured to move the robot arm based on a motion program stored in a memory; a display screen; and a display controller configured to generate and display a constant velocity area of a control point path for the robot arm. The motion program instructs the robot controller to move a control point on the robot arm along the control point path. The display controller being configured to display the constant velocity area by generating a path display image depicting the control point path, displaying the path display image on a display screen, and superimposing a constant velocity area on the path display image.

4 Claims, 9 Drawing Sheets

FIG. 7

```
Motor on
Power High

SpeedS 20
AccelS 800, 500

P10 = ConstSpdPos(P1, Move, Acceleration, Translational)
```

FIG. 8

```
Print Dist(P1, P10)
If Dist(Here, P10) > Dist(Here,P(StartDispensing) Then
        Print "Exceeding distance:" , Dist(Here, P10) - Dist(Here,P(StartDispensing)
Error
EndIf Move P1
```

FIG. 9

```
Motor on
Power High

SpeedR 60
AccelR 600, 600

P10 = ConstSpdPos(P1, Move, Acceleration, Rotational)
P11 = ConstSpdPos(P1, Move, Deceleration, Rotational)
```

FIG. 10

```
Print JAngle (P10, 6) - JAngle(P11, 6)
If abs(JAngle (P10, 6) - JAngle(P11, 6)) < 360 Then
        Print "Check AccelR and starting Point"
Error
Endif Move P1 ROT
```

FIG. 11

```
FSet FC1.Enabled, True, True, True, False, False, False
Move P1 FC1 ROT
```

FIG. 12

```
rDparameter = ConstSpdDparam (P1, Move, Acceleration, Translational)
Move P1 ! D(rDparameter): On DispenseStart !
```

CONTROL APPARATUS, ROBOT, AND ROBOT SYSTEM

The present application is based on and claims priority from JP Application Serial Number 2018-084831, filed Apr. 26, 2018, the disclosure of which is hereby incorporated by reference herein in its entirety.

BACKGROUND

1. Technical Field

The present disclosure relates to a control apparatus, a robot, and a robot system.

2. Related Art

Research and development on a control apparatus controlling a robot is under way.

In this regard, as for a robot language processing apparatus displaying a robot program describing contents of work by a robot, there is provided a robot language processing apparatus that includes a display unit, a storage unit, and a processing unit. The display unit has a display screen configured to display graphically. The storage unit stores a robot program which includes a group of move commands describing an interpolation classification in a section between time-series spatial positions of a robot and whether each of the sections is a work section or an air-cut section. The processing unit refers to and interprets the robot program stored in the storage unit, acquires a group of lines corresponding to the group of move commands by interpolating the respective spatial positions in accordance with the interpolation classification, converts the group of lines into coordinates on the display screen viewed from an arbitrary viewpoint to graphically display the group of lines on the display screen, and, when a command is input, displays on the display screen only the lines corresponding to the work section among the group of lines after the conversion (refer to JP-A-10-291183).

In other words, the air cut section described above includes a subsection in which the robot operates at a constant velocity. That is, the robot language processing apparatus disclosed in JP-A-10-291183 graphically displays whether each of a plurality of sections is an air-cut section including a section in which the robot moves at a constant velocity or a work section.

Here, causing a robot to perform a work while the robot is operating at a constant velocity enables the robot to perform a homogeneous work. For example, causing a robot to weld while the robot is operating at a constant velocity enables the robot to perform welding with no irregularity. Also, for example, causing a robot to apply an ejection substance such as an adhesive, grease, or the like while the robot is operating at a constant velocity enables the robot to apply the ejection substance with no irregularity. On the other hand, it is difficult for a user to identify a subsection in which a robot moves at a constant velocity by observing motion of the robot. However, the robot language processing apparatus disclosed in JP-A-10-291183 cannot graphically display the subsection in a certain air-cut section. As a result, the user cannot accurately identify the subsection with the robot language processing apparatus and sometimes cannot cause the robot to perform a work accurately.

SUMMARY

An aspect of the present disclosure is directed to a control apparatus that controls a robot performing a predetermined work on a target object by an end effector provided in a robot arm and that includes a display controller which outputs a display signal to display an image including a first position which is taught and through which a predetermined portion of the end effector passes, a second position which is taught and at which a work on the target object starts, and a third position which is located between the first position and the second position and at which velocity of the end effector with respect to the target object is constant.

Another aspect of the present disclosure is directed to a robot controlled by the control apparatus as the robot.

Still another aspect of the present disclosure is directed to a robot system including the control apparatus and the robot.

BRIEF DESCRIPTION OF THE DRAWINGS

FIG. 7 is a diagram showing a first example of a part of a motion program edit image displayed on a display unit of the information processing apparatus.

FIG. 8 is a diagram showing a second example of a part of the motion program edit image displayed on the display unit of the information processing apparatus.

FIG. 9 is a diagram showing a third example of a part of the motion program edit image displayed on the display unit of the information processing apparatus.

FIG. 10 is a diagram showing a fourth example of a part of the motion program edit image displayed on the display unit of the information processing apparatus.

FIG. 11 is a diagram showing a fifth example of a part of the motion program edit image displayed on the display unit of the information processing apparatus.

FIG. 12 is a diagram showing a sixth example of a part of the motion program edit image displayed on the display unit of the information processing apparatus.

DESCRIPTION OF EXEMPLARY EMBODIMENTS

Embodiment

Hereinafter, embodiments of the present disclosure will be described with reference to the drawings.

Configuration of Robot System

Figure 1:
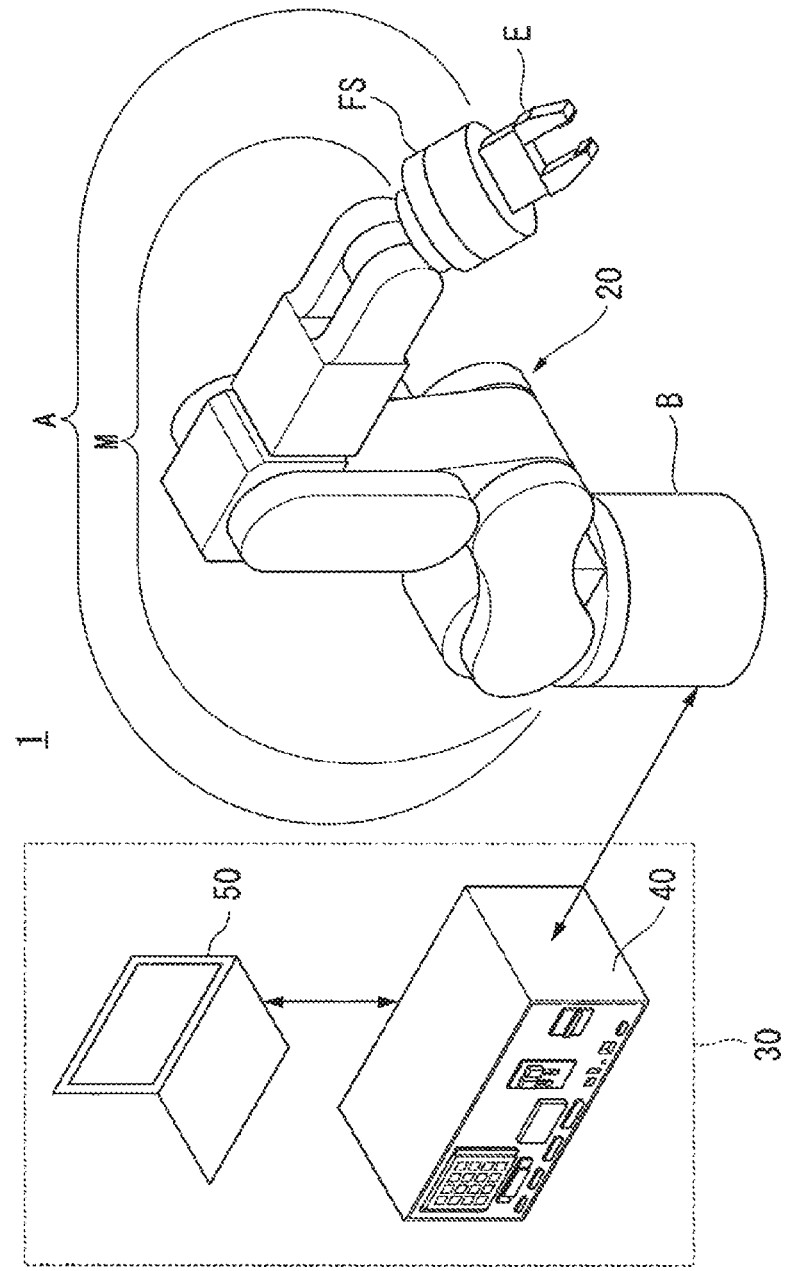
FIG. 1 is a view showing an example of a configuration of a robot system according to an embodiment.

First, a configuration of a robot system 1 will be described. FIG. 1 is a view showing an example of a configuration of a robot system 1 according to the embodiment. The robot system 1 includes a robot 20 and a control apparatus 30. Also, the control apparatus 30 includes a robot control apparatus 40 and an information processing apparatus 50. The robot system 1 may also be configured to include an imaging unit, an image processing device controlling the image unit, and the like. Also, the control apparatus 30 may be configured to include other apparatuses in addition to the robot control apparatus 40 and information processing apparatus 50. Also, the robot control apparatus 40 and the information processing apparatus 50 may be configured to be integrated into a single control apparatus 30.

The robot 20 is a single arm robot provided with an arm A and a base B for supporting the arm A. It should be noted that the robot 20 may be a multi-arm robot instead of a single arm robot. Here, among multi-arm robots, a robot provided with two arms is called double arm robot. That is, the robot 20 may be a double arm robot provided with two arms or may be a multi-arm robot with three or more arms. Also, the robot 20 may be another robot such as a scara robot (horizontal articulated robot), an orthogonal coordinate robot, or a cylindrical robot.

The arm A includes an end effector E, a manipulator M and a force sensing unit FS. The arm A may be configured not to include the end effector E. Also, the arm A may be configured not to include the force sensing unit FS.

The end effector E is shaped in accordance with work a user causes the robot 20 to perform. In the example shown in FIG. 1, the end effector E has a finger unit and holds an object by pinching the object with the finger unit. It should be noted that the end effector E may be replaced with another end effector such as, for example, an end effector having a cylindrical portion at a tip end to be used in a work of pressing a button or the like, or an end effector having a dispenser for ejecting an ejection substance such as an adhesive to be used in a work of applying an ejection substance to a target object.

The manipulator M is a six-axis vertical articulated manipulator. That is, the arm A is a six-axis vertical articulated arm. The manipulator M may be a vertical articulated manipulator with five or fewer axes or a vertical articulated manipulator with seven or more axes.

The force sensing unit FS senses either or both of translational force and rotational moment acting on the force sensing unit FS as an external force acting on the force sensing unit FS. The force sensing unit FS is a force sensor, for example. The force sensing unit FS may be replaced with another sensing unit sensing an external force acting on the force sensing unit FS such as a torque sensing unit.

In this example, the force sensing unit FS is provided between the end effector E and the manipulator M. In other words, by being provided therebetween, the force sensing unit FS senses an external force acting on the force sensing unit FS as an external force acting on a hand (not shown) of the robot 20. The hand is the end effector E or an object held by the end effector E. The force sensing unit FS senses external force acting on the hand and outputs external force information indicating the sensed external force to the robot control apparatus 40. The external force information output from the force sensing unit FS is used in a force control of the robot 20 by the robot control apparatus 40. The force control is a compliant motion control. In the following, as an example, a case where the force control is the impedance control among the compliant motion controls is described.

The robot control apparatus 40 controls the robot 20. At this time, based on the operation received from a user through the information processing apparatus 50, the robot control apparatus 40 sets a control point T which is a virtual point moving together with the arm A of the robot 20 to a predetermined position of the arm A. The control point T is TCP (Tool Center Point) for the arm A, for example. Also, among the positions on the central axis of the end effector E, the predetermined position of the arm A is a position desired by the user, for example. The central axis of the end effector E coincides with a pivot axis of a joint provided farthest away from the base B among the six joints possessed by the manipulator M to be described later. It should be noted that, instead of being the TCP, the control point T may be another virtual point moving together with the arm A. Also, the predetermined position may be another position corresponding to the arm A instead of the position on the central axis.

The robot control apparatus 40 acquires the external force information from the force sensing unit FS based on the motion program stored in advance in a memory included in the robot control apparatus 40 and moves the arm A by impedance control based on the acquired external force information. The memory included in the robot control apparatus 40 is omitted in FIG. 1 to avoid complication of the drawing.

Also, the robot control apparatus 40 moves the arm A by a continuous path control based on the motion program, for example. More specifically, in the continuous path control, the robot control apparatus 40 specifies a teaching point matching the control point T next based on the motion program. The teaching point is a virtual point targeted to match the control point T. Here, when the robot 20 matches the control point T with the teaching point, the position of the control point T coincides with the position of the teaching point. Also, in this case, the attitude of the control point T coincides with the attitude of the teaching point. In the following, the teaching point that the control point T matches at present is referred to as a first teaching point, and the teaching point that the control point T will match next is referred to as a second teaching point.

When the second teaching point is specified, the robot control apparatus 40 specifies information regarding how to move the control point T designated by the motion program. The information regarding how to move the control point T includes a part or the whole of information indicating either or both of velocity and angular velocity of the control point T during constant velocity motion of the control point T, information indicating either or both of the acceleration and the angular acceleration when the control point T accelerates, information indicating either or both of the acceleration (that is, deceleration) and the angular acceleration (that is, angular deceleration) when the control point T decelerates, information indicating that the control point T is made to perform translational motion, information indicating that the control point T is made to perform rotational motion, and the like. That is, in the motion program, information regarding how to move the control point T is designated by a plurality of commands described as the motion program.

Based on the information regarding the specified second teaching point and how to move the specified control point T, the robot control apparatus 40 calculates a control point path in which the control point T is moved from the first teaching point to the second teaching point. Here, each point on the control point path corresponds to the elapsed time and indicates the position and attitude of the control point T at each elapsed time. The robot control apparatus 40 controls the arm A so that the control point T moves along the calculated control point path. The robot control apparatus 40 can cause the robot 20 to perform a predetermined work by operating the arm A by a continuous path control in this way. The motion program described above is an example of a predetermined command. Also, the continuous path control is also referred to as a CP control. Since the calculation method of the control point path by the continuous path control may be a method already known or a method to be developed, a further detailed description is omitted.

Also, based on the motion program, the robot control apparatus 40 moves the arm A in combination with the impedance control and the continuous path control described above.

Also, based on the motion program in combination with the external force information acquired from the force sensing unit FS and the continuous path control, the robot control apparatus 40 moves the arm A. For example, the robot control apparatus 40 starts to move the arm A by the continuous path control based on the motion program. Then, the robot control apparatus 40 continues to move the arm A by the continuous path control until either or both of the translational force and rotational moment, among the external force indicated by the external force information acquired from the force sensing unit FS, acting in a predetermined direction satisfy a predetermined stop condition. The robot control apparatus 40 stops the motion when the stop condition is satisfied. The stop condition is, for example, that a predetermined threshold value is exceeded, but is not limited thereto.

Here, for example, when the robot 20 performs a work of applying an ejection substance to a target object with a dispenser in either an acceleration section (an acceleration area) or a deceleration section (a deceleration area) among the sections included in the control point path, since the velocity of the control point T is not constant, the amount of the ejection substance applied to the target object may vary depending on positions on the target object. As a result, the robot 20 may not be able to improve the quality of the work of applying the ejection substance to the target object sometimes. That is, the robot 20 may not be able to improve the accuracy of the work. Among the sections included in the control point path, the acceleration section is a section in which the control point T performs an acceleration motion. Among the motions performed by the control point T, the acceleration motion is a motion in which either or both of the velocity and the angular velocity of the control point T increase with the lapse of time. Among the sections included in the control point path, the deceleration section is a section in which the control point T performs a deceleration motion. The deceleration motion is a motion in which either or both of the velocity and the angular velocity of the control point T decrease with the lapse of time.

Figure 2:
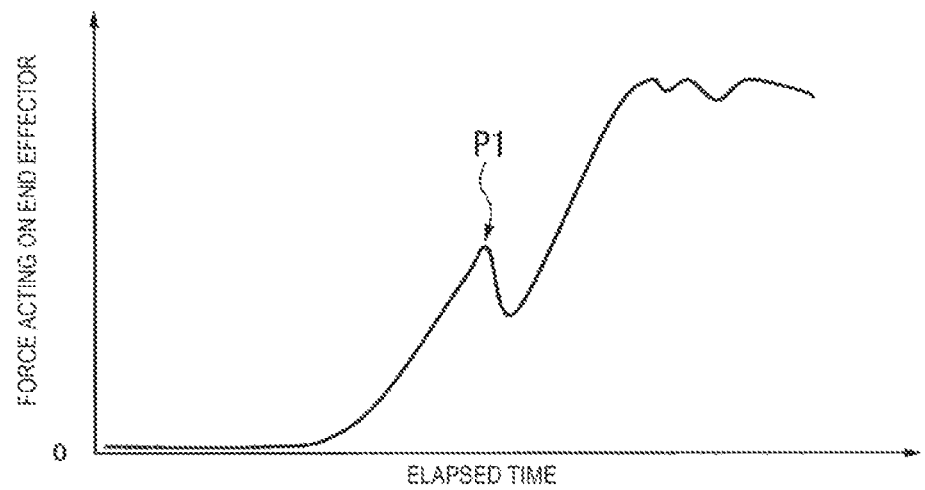
FIG. 2 is a graph showing an example of a relationship between force acting on an end effector from a button and elapsed time in a work of inspecting the quality of the button.

Also, for example, when the robot 20 performs a work of inspecting the quality of a button by pressing the button in one of the acceleration section and the deceleration section among the sections included in the control point path, since the velocity of the control point T is not constant, a temporal change of the force acting on the end effector E from the button may vary each time the work is performed. FIG. 2 is a graph showing an example of a relationship between the force acting on the end effector E from the button and the elapsed time in the work of inspecting the quality of the button. Also, the graph shown in FIG. 2 is an example of a graph when the robot 20 performs the work of inspecting the quality of the button in the acceleration section. The horizontal axis of the graph shown in FIG. 2 indicates the elapsed time. The vertical axis of the graph shown in FIG. 2 indicates the force acting on the end effector E in the direction in which the robot 20 presses the button. A peak P1 shown in FIG. 2 indicates an operation force of the button to be inspected by the robot 20. When the robot 20 performs the work in the acceleration section, the position of peak P1 changes each time the work is performed. That is, the robot 20 cannot accurately inspect the operation force of the button targeted for inspection, and sometimes it becomes impossible to select defective products. This is because the position of the peak P1 can also change when the button is defective. Therefore, when the robot 20 performs the work in the acceleration section, the robot 20 may not be able to perform the work accurately.

Figure 3:
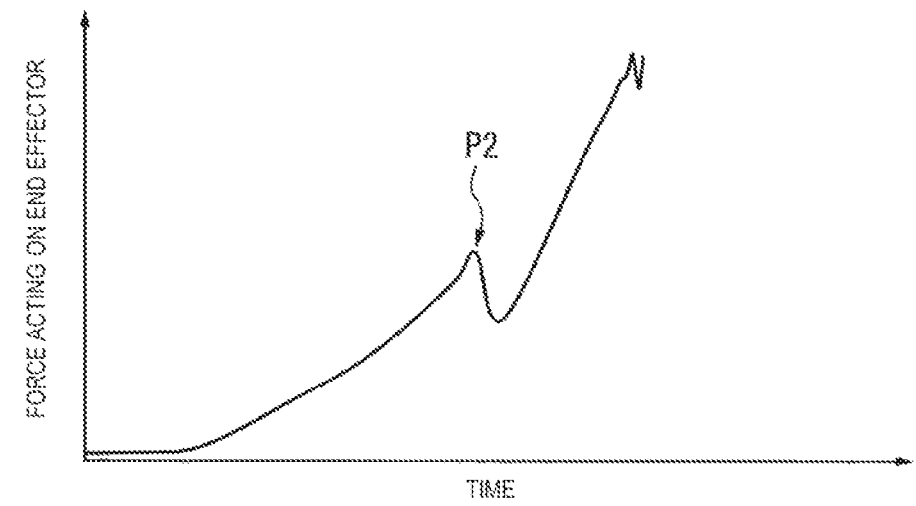
FIG. 3 is a graph showing an example of a relationship between force acting on an end effector from a button and a change in the position of an end effector in the work of inspecting the quality of the button.

FIG. 3 is a graph showing an example of a relationship between the force acting on the end effector E from the button and the change in the position of the end effector E in the work of inspecting the quality of the button. The change in the position is a change in the position of the end effector E in the direction in which the robot 20 presses the button. Then, the graph shown in FIG. 3 is an example of a graph when the robot 20 performs a work of inspecting the quality of the button in the acceleration section among the sections included in the control point path. The horizontal axis of the graph shown in FIG. 3 indicates the elapsed time. The vertical axis of the graph shown in FIG. 3 indicates the force acting on the end effector E in the direction. A peak P2 shown in FIG. 3 indicates the operation force of the button targeted for inspection. When the robot 20 performs the work in the acceleration section, the position of the peak P2 may change each time the work is performed in the same way as the peak P1 shown in FIG. 2. That is, the robot 20 cannot accurately inspect the operation force of the button to be inspected, and sometimes it becomes impossible to sort out defective products. This is because the position of the peak P2 can also change when the button is defective. Therefore, when the robot 20 performs the work in the acceleration section, the robot 20 may not be able to perform the work accurately.

In this way, when the control point T is performing an acceleration motion or a deceleration motion, that is, when the velocity of the control point T is not constant, the robot 20 cannot perform the work accurately if the robot 20 performs a predetermined work.

Then, based on the motion program, the robot control apparatus 40 calculates either or both of a start point and an end point of a constant velocity section (a constant velocity area) in which the control point T performs a constant velocity motion among the sections included in the control point path in which the control point T moves from the first teaching point to the second teaching point by the continuous path control. In the present embodiment, among the motions of the control point T, the constant velocity motion of the control point T refers to a motion in which neither the velocity nor the angular velocity of the control point T changes with the lapse of time. Here, the control point T performs any one of a translational motion, a rotational motion and a composite motion in which the translational motion and the rotational motion are combined in each of the acceleration section, the deceleration section, and the constant velocity section. The translational motion performed by the control point T is a motion that changes the position of the control point T without changing the attitude of the control point T. Also, the rotational motion performed by the control point T is a motion changing the attitude of the control point T without changing the position of the control point T. The composite motion performed by the control point T is a motion changing the position and attitude of the control point T. It should be noted that the composite motion performed by the control point T may be a motion in which the translational motion is prioritized over the rotational motion, or may be a motion in which the rotational motion is prioritized over the translational motion. In the following, the description of the case where the motion of the control point T is a composite motion will be omitted to simplify descriptions.

More specifically, based on the motion program, the robot control apparatus 40 calculates the position and attitude at which the acceleration in the motion of the control point T ends as a start point of the constant velocity section in the control point path. Also, based on the motion program, the robot control apparatus 40 calculates the position and attitude at which the deceleration in the motion of the control point T starts as an end point of the constant velocity section in the control point path. That is, based on the motion program, the robot control apparatus 40 calculates either or both of the position and attitude at which the acceleration in the motion of the control point T ends and the position and attitude at which the deceleration in the motion of the control point T starts on the control point path. In this way, it is possible that the robot control apparatus 40 accurately designates the constant velocity section in the control point path by the motion program. As a result, the robot control apparatus 40 can cause the robot 20 to accurately perform various kinds of inspections and suppress the production of defective products, for example. Also, while displaying a virtual space in which the work area where the robot 20 performs work is virtually reproduced, the robot control apparatus 40 can display the constant velocity section in the control point path in the virtual space. As a result, the robot control apparatus 40 can be restrained from causing the robot 20 to perform work in the acceleration section or the deceleration section, and either or both of the accuracy and efficiency of the work performed by the robot 20 can be improved.

When the control point T is made to perform a translational motion, the robot control apparatus 40 may be configured to calculate, based on the motion program, either or both of the position at which the acceleration in the motion of the control point T ends and the position at which the deceleration in the motion of the control point T starts in the control point path. This is because the attitude of the control point T does not change in this case. Also, when the control point T is made to perform a rotational motion, the robot control apparatus 40 may be configured to calculate, based on the motion program, either or both of the attitude at which the acceleration in the motion of the control point T ends and the attitude at which the deceleration in the motion of the control point T starts in the path in which the control point T is moved from the first teaching point to the second teaching point by the continuous path control. This is because the position of the control point T does not change in this case.

The robot control apparatus 40 also moves the arm A by another control such as continuous positioning control in addition to the continuous path control and force control described above. However, in the present embodiment, the description of the other control will be omitted.

Also, the robot control apparatus 40 receives various operations from a user through an information processing apparatus 50 and performs processing in accordance with the received operations. For example, the robot control apparatus 40 outputs information corresponding to the operations to the information processing apparatus 50. Also, the robot control apparatus 40 displays various images on the information processing apparatus 50 in accordance with the operations. Also, the robot control apparatus 40 moves the arm A in accordance with the operation.

Also the robot control apparatus 40 acquires various information from the information processing apparatus 50. The robot control apparatus 40 performs processing in accordance with the acquired information. For example, the robot control apparatus 40 acquires the motion program described above from the information processing apparatus 50. The robot control apparatus 40 stores the acquired motion program in a memory provided in the robot control apparatus 40.

The information processing apparatus 50 is an information processing apparatus such as a notebook PC (Personal Computer), a tablet PC, or the like and a teaching device such as a teaching pendant. The information processing apparatus 50 may be another information processing apparatus such as a desktop PC, a workstation, a multifunctional cellular phone terminal (smartphone), a cellular phone terminal, a PDA (Personal Digital Assistant), or the like.

The information processing apparatus 50 receives various operations from the user. The information processing apparatus 50 performs processing in accordance with the received operations. For example, the information processing apparatus 50 outputs information corresponding to the operations to the robot control apparatus 40. Also, the information processing apparatus 50 generates the motion program based on the operations and outputs the generated motion program to the robot control apparatus 40. Also, information processing apparatus 50 controls the robot control apparatus 40 based on the operations and moves the arm A through the robot control apparatus 40.

Also, the information processing apparatus 50 acquires various information from the robot control apparatus 40. The information processing apparatus 50 performs processing in accordance with the acquired information. For example, the information processing apparatus 50 displays an image in accordance with the information acquired from the robot control apparatus 40.

Hardware Configuration of Robot Control Apparatus

Figure 4:
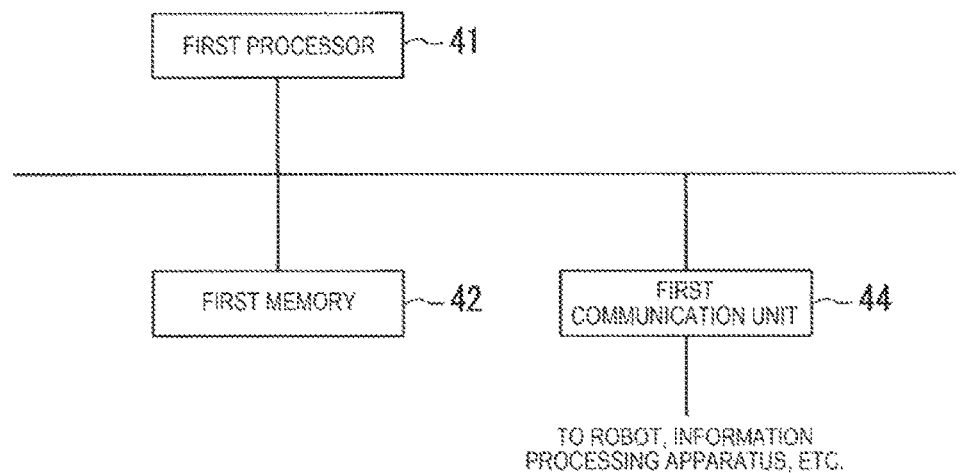
FIG. 4 is a diagram showing an example of a hardware configuration of a robot control apparatus.

In the following, a hardware configuration of the robot control apparatus 40 will be described with reference to FIG. 4. FIG. 4 is a diagram showing an example of the hardware configuration of the robot control apparatus 40.

The robot control apparatus 40 includes a first processor 41, a first memory 42, and a first communication unit 44. These components are communicably coupled to each other through a bus. Also, the robot control apparatus 40 performs communication with the robot 20 and the information processing apparatus 50 respectively through the first communication unit 44.

The first processor 41 is a central processing unit (CPU), for example. The first processor 41 may be another processor such as a field-programmable gate array (FPGA) or the like instead of the CPU. The first processor 41 executes various programs stored in the first memory 42. The first memory 42 includes a Hard disk drive (HDD), a solid state drive (SSD), an electrically erasable programmable read-only memory (EEPROM), a read-only memory (ROM), a random access memory (RAM), or the like. Instead of being built in the robot control apparatus 40, the first memory 42 may be an external storage device coupled by a digital input/output port or the like such as universal serial bus (USB) or the like. The first memory 42 stores various information processed by the robot control apparatus 40, various images, motion programs and the like. The first communication unit 44 is configured to include a digital input/output port such as USB, an Ethernet (registered trademark) port, and the like. It should be noted that the robot control apparatus 40 may be configured to include an input device such as a key board, a mouse, a touchpad, and the like. Also, the robot control apparatus 40 may be configured to include a display device including a liquid crystal display panel, an organic electroluminiscence (EL) display panel, or the like.

Hardware Configuration of Information Processing Apparatus

Figure 5:
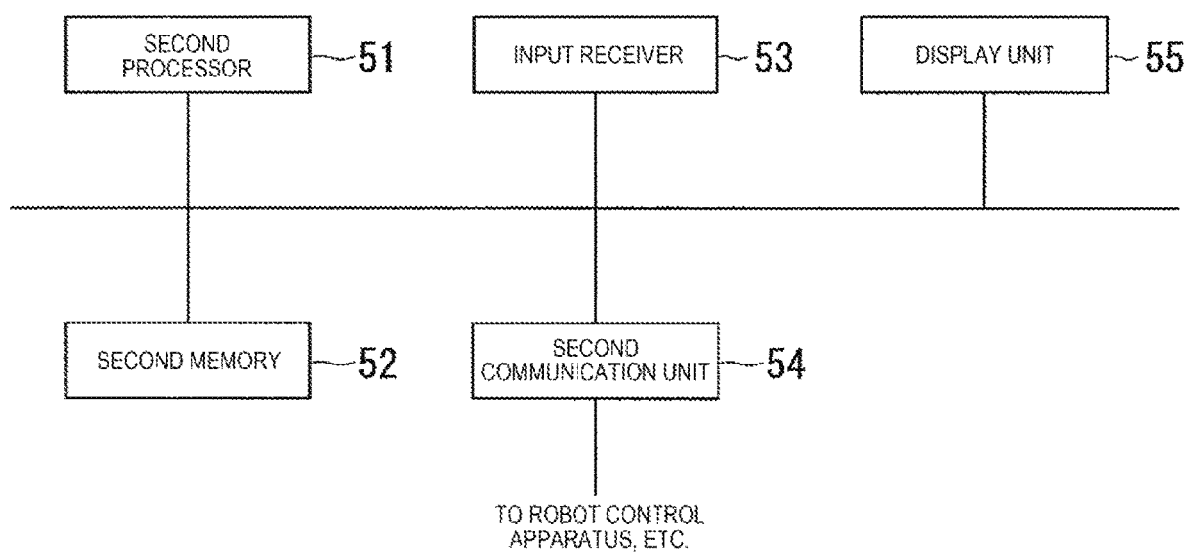
FIG. 5 is a diagram showing an example of a hardware configuration of an information processing apparatus.

In the following, the hardware configuration of the information processing apparatus 50 will be described with reference to FIG. 5. FIG. 5 is a diagram showing an example of a hardware configuration of the information processing apparatus 50.

The information processing apparatus 50 includes a second processor 51, a second memory 52, an input receiver 53, a second communication unit 54, and a display unit 55, for example. These components are communicably coupled to each other through a bus. Also, the information processing apparatus 50 performs communication with the robot control apparatus 40 through the second communication unit 54.

The second processor 51 is a CPU, for example. The second processor 51 may be another processor such as an FPGA, or the like, instead of the CPU. The second processor 51 executes various programs stored in the second memory 52. The second memory 52 includes an HDD or an SSD, an EEPROM, a ROM, a RAM, and the like, for example. Instead of being built in the information processing apparatus 50, the second memory 52 may be an external storage device coupled with a digital input/output port or the like such as a USB. The second memory 52 stores various information processed by the information processing apparatus 50 and various images. The input receiver 53 is an input device such as a keyboard, a mouse, or a touchpad, for example. The input receiver 53 may be another input device such as a touch panel into which the input receiver is integrated with the display unit 55. The second communication unit 54 is configured to include a digital input/output port such as USB or the Ethernet (registered trademark) port, and the like, for example. The display unit 55 is a display device including a liquid crystal display panel, an organic EL display panel, or the like, for example.

Functional Configuration of Robot Control Apparatus

Figure 6:
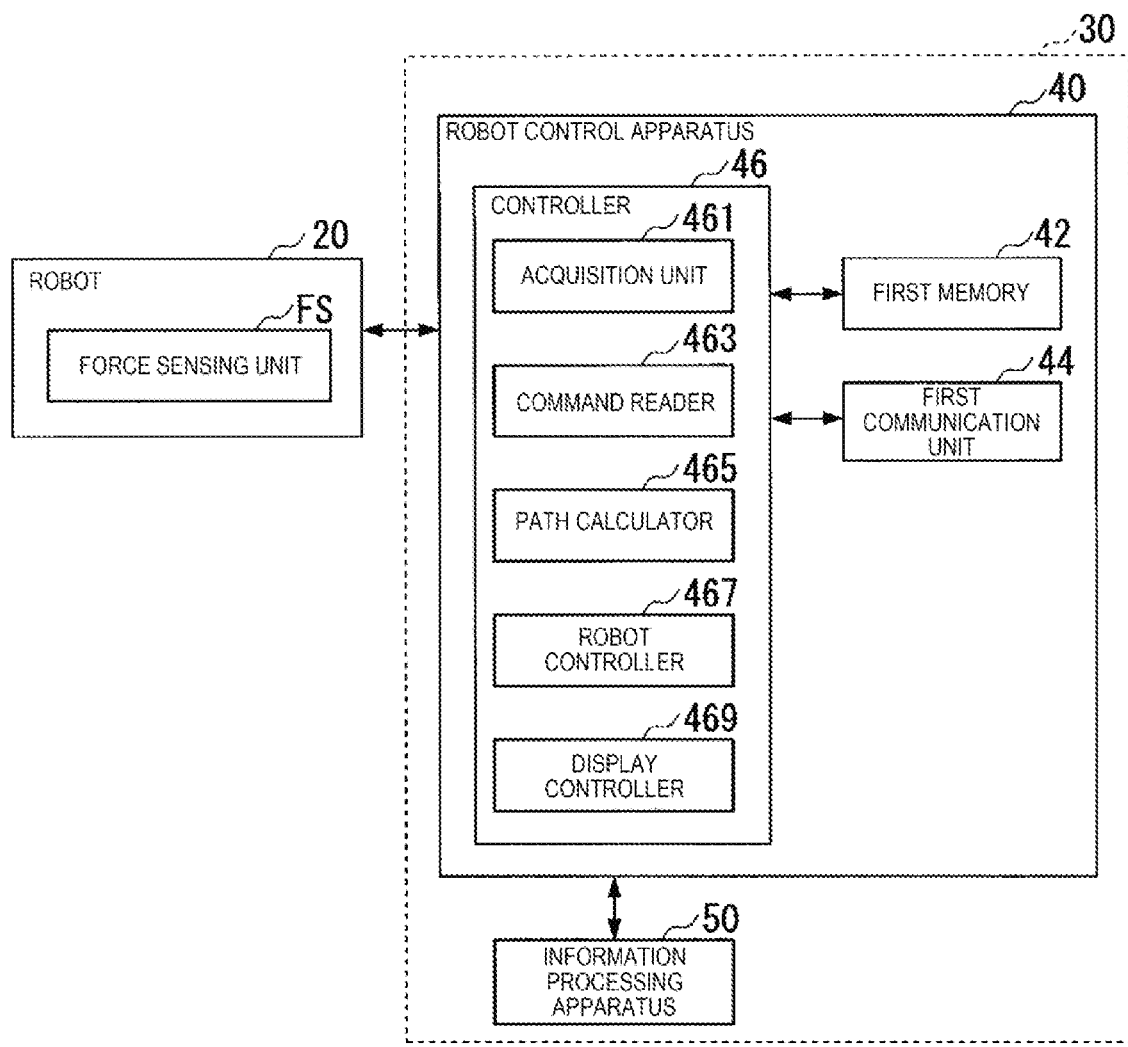
FIG. 6 is a diagram showing an example of a functional configuration of the robot control apparatus.

In the following, a functional configuration of the robot control apparatus 40 will be described with reference to FIG. 6. FIG. 6 is a diagram showing an example of the functional configuration of the robot control apparatus 40.

The robot control apparatus 40 includes the first memory 42, the first communication unit 44 and the controller 46.

The controller 46 controls the whole of the robot control apparatus 40. The controller 46 includes an acquisition unit 461, a command reader 463, a path calculator 465, a robot controller 467, and a display controller 469. These functional units included in the controller 46 are realized by the first processor 41 executing various commands stored in the first memory 42, for example. Also, a part or whole of the functional units may be a hardware functional unit such as a large scale integration (LSI), an application specific integrated circuit (ASIC), or the like.

The acquisition unit 461 acquires from the force sensing unit FS external force information indicating the external force sensed by the force sensing unit FS.

The command reader 463 reads the motion program stored in the first memory 32. The command reader 463 reads in commands included in the read motion program one by one from the top. When the command read by the command reader 463 is a command to be executed by the path calculator 465, the path calculator 465 performs processing in accordance with the command. For example, the path calculator 465 calculates the control point path described above in accordance with the command. When the command read by the command reader 463 is a command to be executed by the robot controller 467, the robot controller 467 performs processing in accordance with the command. For example, in accordance with the command, the robot controller 467 controls the robot 20 based on the external force information acquired by the acquisition unit 461. Also, in accordance with the command, the robot controller 467 controls the robot 20 so that the control point T moves along the control point path calculated by the path calculator 465. The display controller 469 generates various images based on the operations received from the user through the information processing apparatus 50. The display controller 469 outputs information indicating the generated images to the information processing apparatus 50 and displays the images on the display unit 55 of the information processing apparatus 50.

Motion Program and Processing Performed by Robot Control Apparatus in Accordance with Motion Program In the following, a motion program and a processing performed by the robot control apparatus 40 in accordance with the motion program will be described respectively with reference to FIGS. 7 to 12. It should be noted that program language in the motion program shown in FIGS. 7 to 12 is no more than an example and may be any program language as long as it is a program language that can be compiled into the robot control apparatus 40.

As described above, in this example, the robot control apparatus 40 calculates either or both of the acceleration end position/attitude and the deceleration start position/attitude in the translational motion or the rotational motion of the control point T based on the motion program. The acceleration end position/attitude is a position and attitude at which the acceleration of the control point T ends in the control point path. The deceleration start position/attitude is a position and attitude at which the deceleration of the control point T starts in the control point path. For example, the robot control apparatus 40 reads the command included in the motion program shown in FIG. 7 and calculates the acceleration end position/attitude in the translational motion of the control point T.

FIG. 7 is a diagram showing a first example of a part of a motion program edit image displayed on the display unit 55 of the information processing apparatus 50. Among the images displayed on the display unit 55 of the information processing apparatus 50, the motion program edit image is an image in which the user performs generation, correction, deletion, or the like (that is, edition) of the motion program through the information processing apparatus 50. The motion program edit image shown in FIG. 7 shows a command to calculate the acceleration end position/attitude in the translational motion of the control point T, various commands relating to the command, and the like among the commands included in the motion program.

Among the commands included in the motion program, "Motor on" shown in FIG. 7 is a command to turn on the power of each of the six motors included in the manipulator M. When the command reader 463 reads the commands, the robot controller 467 turns on the power.

Also, 'Power High" shown in FIG. 7 is a command to switch the motion mode of the robot control apparatus 40 to a mode for driving each of the six motors included in the manipulator M with high power. When the command reader 463 reads the command, the robot controller 467 switches the motion mode to the mode.

Also, "SpeedS 20" described in FIG. 7 is a command to set the velocity of the control point T to 20 [mm/s] during the constant velocity motion of the control point T. When the command reader 463 reads the command, the robot controller 467 sets the velocity of the control point T to 20 [mm/s] during the constant velocity motion of the control point T. For example, in this case, the robot controller 467 stores the information indicating 20 [mm/s] as the information indicating the velocity of the control point T in the first memory 42 so as to set the velocity of the control point T to 20 [mm/s] during the constant velocity motion of the control point T.

Also, "AccelS 800, 500" shown in FIG. 7 is a command to set the acceleration of the control point T in the acceleration section during translational motion of the control point T to 800 [mm/s$^2$] and set the acceleration (that is, deceleration) of the control point T in the deceleration section during translational motion of the control point T to 500 [mm/s$^2$]. When the command reader 463 reads the command, the robot controller 467 sets the acceleration of the control point T in the acceleration section during translational motion of the control point T to 800 [mm/s$^2$] and sets the acceleration of the control point T in the deceleration section during translational motion of the control point T to 500 [mm/s$^2$]. For example, in this case, the robot controller 467 stores the information indicating 800 [mm/s$^2$] in the first memory 42 as the information indicating the acceleration of the control point T in the acceleration section during the translational motion of the control point T so as to set the acceleration to 800 [mm/s$^2$]. Also, in this case, the robot controller 467 stores the information indicating 500 [mm/s$^2$] in the first memory 42 as the information indicating the acceleration of the control point T in the deceleration section during the translational motion of the control point T so as to set the acceleration to 500 [mm/s$^2$].

Also, "ConstSpdPos" shown in FIG. 7 is a function that passes four arguments so as to return as return values the acceleration end position/attitude in the translational motion of the control point T, the deceleration start position/attitude in the translational motion of the control point T, the acceleration end position/attitude in the rotational motion of the control point T, and the deceleration start position/attitude in the rotational motion of the control point T. Each of the eleventh argument for designating the position and attitude of the second teaching point, the twelfth argument for designating the movement of the control point T, the thirteenth argument for designating either of the acceleration end position/attitude and the deceleration start position/attitude as a return value, and the fourteenth argument for designating either of the translational motion and the rotational motion as a motion of the control point T is included in the four arguments.

Here, in the example shown in FIG. 7, the position and attitude of the second teaching point are passed as the eleventh argument by "P1" in "ConstSpdPos". That is, "P1" is a variable in which the position and attitude of the second teaching point are stored. Also, in the example, movement of the control point T is passed as the twelfth argument by "Move" in the "ConstSpdPos". That is, "Move" is a variable indicating the movement of the control point T. Also, in the example, the acceleration end position/attitude is passed as the thirteenth argument by "Acceleration" in "ConstSpdPos". That is, "Acceleration" is a variable indicating the acceleration end position/attitude. Also, in the example, the translational motion is passed as the fourteenth argument by "Translational" in "ConstSpdPos". That is, "Translational" is a variable indicating the translational motion.

Therefore, "ConstSpdPos (P1, Move, Acceleration, Translational)" shown in FIG. 7 returns the acceleration end position/attitude when the control point T is moved by a translational motion from the first teaching point to the second teaching point designated by "P1" as the return value.

Then "P10" shown in FIG. 7 is a variable for storing a return value returned by "ConstSpdPos (P1, Move, Acceleration, Translational)". That is, "P10=ConstSpdPos (P1, Move, Acceleration, Translational)" shown in FIG. 5 is a command to store in "P10" the acceleration end position/attitude when the control point T is moved by the translational motion from the first teaching point to the second teaching point designated by "P1". When the command reader 463 reads the command, the path calculator 465 acquires the information indicating pivot angle of each joint included in the manipulator M from the encoder of each of the six motors included in the manipulator M. The path calculator 465 calculates the current position and attitude of the control point T, that is, the position and attitude of the first teaching point, by forward kinematics based on the pivot angle indicated by the acquired information. The path calculator 465 calculates the acceleration end position/attitude in translational motion of the control point T based on the calculated position and attitude of the first teaching point, the position and attitude of the second teaching point designated by "P1", the velocity of the control point T during constant velocity motion of the control point T, the acceleration of the control point T in the acceleration section during the translational motion of the control point T, and the acceleration of the control point T in the deceleration section during the translational motion of the control point T. The path calculator 465 stores the calculated acceleration end position/attitude in "P10".

"ConstSpdPos (P1, Move, Deceleration, and Translational)" in which "Acceleration" of "ConstSpdPos (P1, Move, Acceleration, Translational)" described above is changed into "Deceleration" returns as a return value the deceleration start position/attitude when the control point T is moved by the translational motion from the first teaching point to the second teaching point designated by "P1", for example.

Also, "ConstSpdPos (P1, Move, Acceleration, and Rotational)" in which "Translational" of "ConstSpdPos (P1, Move, Acceleration, Translational)" described above is changed into "Rotational" returns as a return value the acceleration end position/attitude when the control point T is moved by rotational motion from the first teaching point to the second teaching point designated by "P1", for example.

Also, "ConstSpdPos (P1, Move, Deceleration, and Rotational)" in which "Acceleration" is changed into "Deceleration" and "Translational" is changed into "Rotational" in "ConstSpdPos (P1, Move, Acceleration, Translational)" described above returns as a return value the deceleration start position/attitude when the control point T is moved by the rotational motion from the first teaching point to the second teaching point designated by "P1", for example.

In this way, the robot control apparatus 40 can calculate either or both of the acceleration end position/attitude and the deceleration start position/attitude in the translational motion or the rotational motion of the control point T based on the motion program.

Also, the robot control apparatus 40 can perform control of the robot 20 using position and attitude stored in P10 by the command shown in FIG. 7 among the commands included in the motion program. For example, the robot control apparatus 40 performs control of the robot 20 using the position and attitude based on a command shown in FIG. 8 among the commands included in the motion program.

FIG. 8 is a diagram showing a second example of a part of the motion program edit image displayed on the display unit 55 of the information processing apparatus 50. In the motion program edit image shown in FIG. 8, among commands included in the motion program, a command to determine whether or not the distance from the position of the first teaching point to the acceleration end position is longer than the distance from the position of the first teaching point to the work start position, various commands relating to the command, and the like are shown. The acceleration end position is the position where the acceleration section ends in the control point path, that is, the position where the acceleration of the control point T ends in the control point path. The work start position is the position where the robot 20 starts a predetermined work among the positions of the control point T in the control point path.

"Dist" shown in FIG. 8 is a function for returning the distance between two points as a return value by passing two arguments. In the two arguments, a twenty-first argument designating the position and attitude of one of the two points and a twenty-second argument designating the position and attitude of the other of the two points are included.

Here, in the example shown in FIG. 8, the position and attitude of the second teaching point are passed as the twenty-first argument by "P1" in "Dist" in the first row. Also, in the example, the acceleration end position/attitude is passed as the twenty-second argument by "P10" in "Dist".

Therefore, "Dist(P1, P10)" shown in FIG. 8 returns as a return value the distance between the position of the second teaching point designated by "P1" and the acceleration end position, which is the position designated by "P10", when the control point T is moved by the translational motion.

That is, "Print Dist(P1, P10)" shown in FIG. 8 is a command to display the distance between the position of the second teaching point designated by "P1" and the acceleration end position, which is the position designated by "P10", when the control point T is moved by the translational motion. When the command reader 463 reads the command, the path calculator 465 calculates the distance between the position among the positions and attitudes of the second teaching point indicated by "P1" and the acceleration end position among the acceleration end positions and attitudes indicated by "P10". Then, the display controller 469 displays the distance calculated by the path calculator 465 on the display unit 55 of the information processing apparatus 50.

Also, "Dist(Here, P10)" shown in FIG. 8 returns as a return value the distance between the current position of the control point T designated by "Here" and the acceleration end position, which is a position designated by "P10, when the control point T is moved by the translational motion.

Also, "P(StartDispensing)" is a variable indicating the work start position described above. Here, in the example shown in FIG. 8, the predetermined work to be performed by the robot 20 is a work of applying an ejection substance to a target object with a dispenser. Therefore, "Dist(Here, P(StartDispensing)" shown in FIG. 8 returns as a return value the distance between the current position of the control point T designated by "Here" and the work start position designated by "P(StartDispensing)".

That is, the If statement shown in FIG. 8 is a command to display the difference between the first distance and the second distance together with "Exceeding distance:" and return an error when a first distance from the current position of the control point T to the acceleration end position is longer than the second distance from the current position of the control point T to the work start position and execute "Move P1" when the first distance is shorter than the second distance. When the command reader 463 reads the command, the path calculator 465 calculates each of the first distance and the second distance. When the calculated first distance is determined to be longer than the calculated second distance, that is, when the robot 20 performs work in a part of the acceleration section described above, the path calculator 465 calculates the difference between the first distance and the second distance. Then, the display controller 469 displays the difference calculated by the path calculator 465 on the display unit 55 of the information processing apparatus 50 together with "Exceeding distance: ". On the other hand, when the path calculator 465 determines that the calculated first distance is longer than the calculated second distance, that is, when the robot 20 does not perform work in the acceleration section, the robot controller 467 executes "Move P1". Here, "Move P1" is a command to start the translational motion of the control point T at the second teaching point designated by "P1". That is, in this case, the robot controller 467 moves the arm A to start the translational motion. In this way, the robot control apparatus 40 can restrain the robot 20 from performing a predetermined work in the acceleration section, and as a result, can cause the robot 20 to perform the work accurately.

In this way, the robot control apparatus 40 can perform control of the robot 20 using the position and attitude stored in "P10" by the command shown in FIG. 7 among the commands included in the motion program.

Also, the robot control apparatus 40 can calculate both of the acceleration end position/attitude and the deceleration start position/attitude in the rotational motion of the control point T by the command shown in FIG. 7 among the commands included in the motion program, for example.

FIG. 9 is a diagram showing a third example of a part of the motion program edit image displayed on the display unit 55 of the information processing apparatus 50. In the motion program edit image displayed in FIG. 9, among the commands included in the motion program, a command to calculate both of the acceleration end position/attitude and the deceleration start position/attitude in the rotational motion of the control point T, various commands relating to the command, and the like are shown.

Also, "SpeedR 60" shown in FIG. 9 is a command to set angular velocity of the control point T to 60[deg/s] during constant velocity motion of the control point T. When the command reader 463 reads the command, the robot controller 467 sets the angular velocity of the control point T during constant velocity motion of the control point T to 60[deg/s]. For example, in this case, the robot controller 467 stores the information indicating 60[deg/s] as the information indicating the angular velocity of the control point T in the first memory 42 so as to set the angular velocity of the control point T to 60[deg/s] during constant velocity motion of the control point T.

Also, "AccelR 600, 600" shown in FIG. 9 is a command to set the angular acceleration (that is, angular deceleration) of the control point T in the deceleration section during the rotational motion of the control point T to 600[deg/s$^2$] while setting the angular acceleration of the control point T in the acceleration section during the rotational motion of the control point T to 600[deg/s$^2$] in the acceleration section during the rotational motion of the control point T. When the command reader 463 reads the command, the robot controller 467 sets the angular acceleration of the control point T to 600[deg/s$^2$] in the acceleration section during the rotational motion of the control point T and sets the angular acceleration of the control point T to 600[deg/s$^2$] in the deceleration section during the rotational motion of the control point T. For example, in this case, the robot controller 467 stores the information indicating 600 [deg/s$^2$] as the information indicating the angular acceleration of the control point T in the acceleration section during the rotational motion of the control point T in the first memory 42 so as to set the angular acceleration to 600 [deg/s$^2$]. Also, in this case, the robot controller 467 stores the information indicating 600 [deg/s$^2$] in the first memory 42 as the information indicating the angular acceleration of the control point T in the deceleration section during the rotational motion of the control point T so as to set the angular acceleration at 600 [deg/s$^2$].

Also, "P10=ConstSpdPos(P1, Move, Acceleration, Rotational) is a command to store in "P10" described in FIG. 9 the acceleration end position/attitude when the control point T is moved by a rotational motion from the first teaching point to the second teaching point designated by "P1". When the command reader 463 reads the command, the path calculator 465 acquires information indicating the pivot angle of each joint included in the manipulator M from the encoder of each of the six motors included in the manipulator M. The path calculator 465 calculates the current position and attitude of the control point T, that is, the position and attitude of the first teaching point, by forward kinematics based on the pivot angle indicated by the acquired information. The path calculator 465 calculates the acceleration end position/attitude in the rotational motion of the control point T based on the calculated position and attitude of the first teaching point, the position and attitude of the second teaching point designated by "P1", the angular velocity of the control point T during constant velocity motion of the control point T, the angular acceleration of the control point T in the acceleration section during the rotational motion of the control point T, and the angular acceleration of the control point T in the deceleration section during the rotational motion of the control point T. The path calculator 465 stores the calculated acceleration end position/attitude in "P10".

Also, "P11=ConstSpdPos(P1, Move, Deceleration, Rotational)" shown in FIG. 9 is a command to store in the variable "P11" the deceleration start position/attitude when the control point T is moved by the rotational motion from the first teaching point to the second teaching point designated by "P1". When the command reader 463 reads the command, the path calculator 465 acquires information indicating the pivot angle of each joint included in the manipulator M from the encoder of each of the six motors included in the manipulator M. The path calculator 465 calculates the current position and attitude of the control point T, that is, the position and attitude of the first teaching point, by the forward kinematics based on the pivot angle indicated by the acquired information. The path calculator 465 calculates the deceleration start position/attitude in the rotational motion of the control point T based on the calculated position and attitude of the first teaching point, the position and attitude of the second teaching point designated by "P1", the angular velocity of the control point T during constant velocity motion of the control point T, the angular acceleration of the control point T in the acceleration section during the rotational motion of the control point T, and the angular acceleration of the control point T in the deceleration section during the rotational motion of the control point T. The path calculator 465 stores the calculated deceleration start position/attitude in "P11".

In this way, the robot control apparatus 40 can calculate both the acceleration end position/attitude and the deceleration start position/attitude in the rotational motion of the control point T based on the motion program.

Also, the robot control apparatus 40 can perform control of the robot 20 using position and attitude stored in "P10" and "P11" shown in FIG. 9 by the command shown in FIG. 10 among the commands included in the motion program. For example, based on the command shown in FIG. 10 among the commands included in the motion program, the robot control apparatus 40 performs control of the robot 20 using position and attitude stored in "P10" and "P11" shown in FIG. 9.

FIG. 10 is a diagram showing a fourth example of a part of the motion program edit image displayed on the display unit 55 of the information processing apparatus 50. In the motion program edit image shown in FIG. 10, among the commands included in the motion program, a command to determine whether or not the difference between the pivot angle of a sixth joint when the position and attitude of the control point T is the position and attitude indicated by "P10" and the pivot angle of the sixth joint when the position and attitude of the control point T is the position and attitude indicated by "P11" is less than 360 [deg], various commands relating to the command, and the like are shown. Here, the sixth joint is a joint provided farthest from the base B among the six joints included in the manipulator M. Also, the sixth joint pivots the end effector E when the end effector E is attached to the manipulator M. Also, in the following, for the convenience in description, the difference will be referred to as a calculation target difference and be described.

"JAngle(P10, 6)" shown in FIG. 10 is a function that returns as a return value the pivot angle of the sixth joint when the position and attitude of the control point T is the position and attitude indicated by "P10".

Also, "JAngle(P11, 6)" shown in FIG. 10 is a function that returns as a return value the pivot angle of the sixth joint when the position and attitude of the control point T is the position and attitude indicated by "P11".

That is, "Print JAngle(P10, 6)–JAngle(P11, 6)" shown in FIG. 10 is a command to display the calculation target difference described above. When the command reader 463 reads the command, the path calculator 465 calculates the pivot angle of the sixth joint of the manipulator M when the position and attitude of the control point T is the position and attitude indicated by "P11" based on the inverse kinematics while calculating the pivot angle of the sixth joint of the manipulator M when the position and attitude of the control point T is the position and attitude indicated by "P10" based on the inverse kinematics. The path calculator 465 calculates the calculation target difference based on the two calculated pivot angles. Then, the display controller 469 displays the calculation target difference calculated by the path calculator 465 on the display unit 55 of the information processing apparatus 50.

Also, the If statement shown in FIG. 10 is a command to display "Check AccelR and starting Point" and return an error when the calculation target difference is smaller than 360[deg] and to execute "Move P1 ROT" when the calculation target difference is larger than 360 [deg]. For example, when the robot 20 pivots a rotary switch 360 [deg] and performs the work of inspecting the quality of the rotary switch accurately, the robot 20 needs to perform the work in the constant velocity section, so that it is necessary to pivot the sixth joint such that the pivot angle is larger than 360 [deg] in the acceleration section, the constant velocity section and the deceleration section combined. For example, when the pivot angle of the control point T in the constant velocity section during the rotational motion of the control point T is 360 [deg], the angular velocity during the constant motion of the control point T is 60 [deg/s], the angular acceleration of the control point T in the acceleration section during the rotational motion of the control point T is 600 [deg/s$^2$], and the angular acceleration of the control point T in the deceleration section during the rotational motion of the control point T is 600 [deg/s$^2$], the pivot angle of the control point T in each of the acceleration section and the deceleration section during the rotational motion becomes 3 [deg]. In this case, the robot 20 needs to pivot the sixth joint at 360 [deg] in the acceleration section, the constant velocity section and the deceleration section combined. In such a case, the robot control apparatus 40 controls the robot 20 by the command. When the command reader 463 reads the command, the path calculator 465 calculates the calculation target difference. When the path calculator 465 determines that the calculated calculation target difference is smaller than 360 [deg], the display controller 469 displays "Check AccelR and starting Point" on the display unit 55 of the information processing apparatus 50 and returns the error. On the other hand, when the path calculator 465 determines that the calculated calculation target difference is larger than 360 [deg], the robot controller 467 executes "Move P1 ROT". Here, "Move P1 ROT" is a command to start the rotational motion of the control point T to the second teaching point designated by "P1". That is, in this case, the robot controller 467 moves arm A to start the rotational motion. In this way, the robot control apparatus 40 restrains the robot 20 from performing a predetermined work in the acceleration section, and as a result, the robot 20 can perform the work accurately.

As such, the robot control apparatus 40 can perform control of the robot 20 using the position and attitude stored in "P10" and "P11" shown in FIG. 9 by the command shown in FIG. 10 among the commands included in the motion program.

Also, by executing the command shown in FIG. 11 together with the commands shown in FIGS. 9 and 10 among the commands included in the motion program, the robot control apparatus 40 can cause the robot 20 to accurately perform the work of measuring the cogging torque of the motor.

FIG. 11 is a diagram showing a fifth example of a part of the motion program edit image displayed on the display unit 55 of the information processing apparatus 50. In the motion program edit image shown in FIG. 11, among the commands included in the motion program when controlling the motion of the control point T by impedance control, a command to specify which one of the translational motion along X-axis in the control point coordinate system indicated by the position and attitude of the control point T, the translational motion along Y-axis in the control point coordinate system indicated by the position and attitude of the control point T, the translational motion along Z-axis in control point coordinate system indicated by the position and attitude of the control point T, the rotational motion around the X-axis, the rotational motion around the Y-axis, and the rotational motion around the Z-axis is to be controlled by impedance control, various commands relating to the command, and the like are shown. Such impedance control is preferably used in a work in which the pivot axis of an object to be rotated is blurred such as a work of measuring cogging torque of a motor, a work of inspecting the quality of a rotary knob, a work of opening/closing a lid of a bottle, and the like.

"PSet FC1.Enabled, True, True, True, False, False, False" shown in FIG. 11 is a command to associate the variable "FC1" with the information indicating that, when the motion of the control point T is controlled by the impedance control, each of the translational motion along the X-axis in the control point coordinate system indicating the position and attitude of the control point T, the translational motion along the Y-axis in the control point coordinate system, and the translational motion along the Z-axis in the control point coordinate system is controlled by the impedance control and each of the rotational motion around the X-axis, the rotational motion around the Y-axis, and the rotational motion around the Z-axis is not controlled by the impedance control. When the command reader 463 reads the command, the robot controller 467 associates the variable "FC1" with the information indicating that, when the motion of the control point T is controlled by the impedance control, each of the translational motion along the X-axis, the translational motion along the Y-axis, and the translational motion along the Z-axis is controlled by the impedance control and each of the rotational motion around the X-axis, the rotational motion around the Y-axis, and the rotational motion around the Z-axis is not controlled by the impedance control.

"Move P1 FC1 ROT" shown in FIG. 11 is a command to start the rotational motion of the control point T to the second teaching point designated by "P1" and to control the motion of the control point T by the impedance control based on the information associated with "FC1". When the command reader 463 reads the command, the robot controller 467 starts the rotational motion of the control point T to the second teaching point designated by "P1" and controls the motion of the control point T by the impedance control based on the information associated with "FC1". In this way, for example, since the robot control apparatus 40 pivots the pivot axis of the motor at 360 [deg] in the constant velocity section in the work of measuring the cogging torque of the motor described above, the control point T can be moved by the translational force received by the control point T from the pivot axis being made zero by the blurring of the pivot axis. As a result, the robot control apparatus 40 can cause the robot 20 to perform the work accurately.

Also, by executing the command shown in FIG. 12 among the commands included in the motion program, the robot control apparatus 40 can cause the robot 20 to start a work when the control point T starts constant velocity motion in the translational motion of the control point T. Here, in FIG. 12, as an example, a case where the work to be performed by the robot 20 is applying an ejection substance to a target object by the end effector E provided with a dispenser is described.

FIG. 12 is a diagram showing a sixth example of a part of the motion program edit image displayed on the display unit 55 of the information processing apparatus 50. In the motion program edit image shown in FIG. 12, among the commands included in the motion program, a command to cause the robot 20 to start a work when the control point T starts to perform the constant velocity motion in the translational motion of the control point T, various commands relating to the command, and the like are shown.

"ConstSpdDparam (P1, Move, Acceleration, Translational)" shown in FIG. 12 is a function that returns as a return value the timing of the control point T starting the constant velocity motion in the translational motion of the control point T. The timing is represented by the ratio of the time needed for the control point T to reach the acceleration end position from the first teaching point by the translation motion with respect to the time needed for the control point T to reach the second teaching point designated by "P1" from the first teaching point by the translational motion. It should be noted that the timing may be configured to be represented by another value based on the time needed for the control point T to reach the acceleration end position from the first teaching point by the translational motion. The thirty-first argument that designates the position and attitude of the second teaching point, the thirty-second argument that designates the movement of the control point T, the thirty-third argument that designates either of the acceleration end position/attitude and the deceleration start position/attitude as a return value, and the thirty-fourth argument that designates either of the translational motion and the rotational motion as a motion of the control point T are included in the four arguments.

Here, in the example shown in FIG. 12, in "ConstSpdDparam", the position and attitude of the second teaching point are passed as the thirst-first argument by "P1". Also, in the example, in "ConstSpdDparam", the movement of the control point T is passed as the thirty-second argument by "Move". Also, in the example, in "ConstSpdDparam", the acceleration end position/attitude is passed as the thirty-third argument by 'Acceleration". Also, in the example, in "ConstSpdDparam", the translational motion is passed as the thirty-fourth argument by "Translational".

Then, "rDparameter" shown in FIG. 12 is a variable that stores a return value returned by "ConstSpdDparam (P1, Move, Acceleration, Translational)". That is, "rDparameter=ConstSpdDparam (P1, Move, Acceleration, Translational)" shown in FIG. 12 is a command to store in "rDparameter" the information indicating the timing of the control point T starting to perform the constant velocity motion in the translational motion of the control point T. When the command reader 463 reads the command, the path calculator 465 calculates the time needed for the control point T to reach the second teaching point designated by "P1" from the first teaching point by the translational motion. Also, in this case, the path calculator 465 calculates the time needed for the control point T to reach the acceleration end position from the first teaching point by the translational motion. Then, the path calculator 465 calculates the ratio of the time needed for the control point T to reach the acceleration end position from the first teaching point by the translational motion with respect to the time needed for the control point T to reach the second teaching point designated by "P1" from the first teaching point by the translational motion. Then, the path calculator 465 stores the calculated ratio in "rDparameter" as the timing described above.

Also, "Move P1!D(rDparameter); On DispenseStart!" shown in FIG. 12 is a command to cause the dispenser provided in the end effector E to start ejection of the ejection substance at the timing of the control point T starting to perform the constant velocity motion. When the work to be performed by the robot 20 is applying an ejection substance to a target object by the end effector E provided with the dispenser, the robot 20 includes a device that controls the dispenser. Then, the robot controller 467 outputs to the device a request for the dispenser to start ejection of the ejection substance. In case where the command reader 463 reads the command, when the control point T is translated from the first teaching point to the second teaching point designated by "P1", the robot controller 467 outputs to the device a request to cause the dispenser to start an ejection of an ejection substance at the timing of the control point T starting to perform the constant velocity motion. That is, the robot control apparatus 40 can control the robot 20 according to the position at which the control point T starts to perform the constant velocity motion and the time at which the control point T starts to perform the constant velocity motion. It should be noted that the robot control apparatus 40 may control the robot 20 in accordance with the time when the control point T starts to perform the constant velocity motion without using the position at which the control point T starts to perform the constant velocity motion. For example, based on a time lag from the time when a request to cause the dispenser to start an ejection of an ejection substance to the device is output to the device until the time when the dispenser is actually caused to start an ejection of an ejection substance, the robot control apparatus 40 may be configured to perform the control for advancing the timing of outputting a request to the device to cause the dispenser to start an ejection of an ejection substance.

"ConstSpdDparam (P1, Move, Deceleration, Translational)" in which "Acceleration" of "ConstSpdDparam (P1, Move, Acceleration, Translational)" described above is changed into "Deceleration" is a function that returns as a return value the timing of the control point T ending the constant velocity motion in the translational motion of the control point T.

Also, "ConstSpdDparam (P1, Move, Acceleration, Rotational)" in which "Translational" of "ConstSpdDparam (P1, Move, Acceleration, Translational)" described above is changed into "Rotational" is a function that returns as a return value the timing of the control point T starting to perform the constant velocity motion in the rotational motion of the control point T.

Also, "ConstSpdDparam (P1, Move, Deceleration, Rotational)" in which "Acceleration" is changed into "Deceleration" and "Translational" is changed into "Rotational" in "ConstSpdDparam (P1, Move, Acceleration, Translational)" described above is a function that returns as a return value the timing of the control point T ending the constant velocity motion in the rotational motion of the control point T.

Processing in which Robot Control Apparatus Displays Constant Velocity Section on Display Unit of Information Processing Apparatus In the following, the processing in which the robot control apparatus 40 displays the constant velocity section on the display unit 55 of the information processing apparatus 50 will be described with reference to FIG. 13. In teaching the robot control apparatus 40 the motion of the robot 20 by the information processing apparatus 50, the robot control apparatus 40 can visually provide the user with a constant velocity section by this processing. As a result, the robot control apparatus 40 can cause the robot 20 to perform highly accurate work based on the information taught by the teaching.

Figure 13:
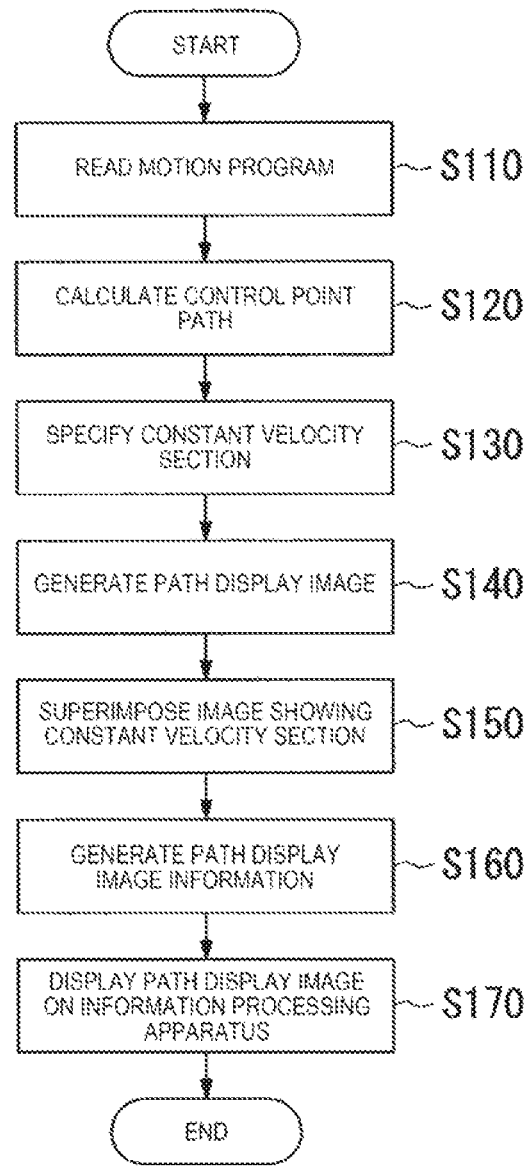
FIG. 13 is a diagram showing an example of a processing flow in which the robot control apparatus displays a constant velocity section on the display unit of the information processing apparatus.

FIG. 13 is a diagram showing an example of a processing flow in which the robot control apparatus 40 displays the constant velocity section on the display unit 55 of the information processing apparatus 50.

The command reader 463 reads the motion program stored in the first memory 42 in advance from the first memory 42 (step S110).

Next, the command reader 463 reads the motion program read from the first memory 42 in the step S110. Based on the motion program read by the command reader 463, the path calculator 465 calculates the control point path (step S120).

Next, based on the motion program read by the command reader 463, the path calculator 465 calculates the acceleration end position/attitude and the deceleration start position/attitude in the control point path calculated in the step S120. Based on the calculated acceleration end position/attitude and the deceleration start position/attitude, the path calculator 465 specifies the constant velocity section in the control point path (step S130).

Next, based on the motion program read by the command reader 463, the display controller 469 generates a path display image (step S140). The path display image is an image displaying the control point path calculated by the path calculator 465. The path display image includes an area for displaying a virtual space in which the work area where the robot 20 performs a work is virtually reproduced. Also, an object or the like which is the virtually reproduced target object on which work is performed by the robot 20 is disposed in the virtual space. The target object is a button pressed by the robot 20, a rotary switch pivoted by the robot 20, an object to which the robot 20 applies an ejection substance by the dispenser, and the like. In the virtual space, a virtual robot virtually reproduced by the robot 20 may be disposed, or the virtual robot may not be disposed. Also, the position in the virtual space is associated with the position in the robot coordinate system of the robot 20.

Next, the display controller 469 superimposes the constant velocity section specified by the path calculator 465 in the step S130 on the path display image generated in the step S140 (step S150). It should be noted that the display controller 469 may be configured to superimpose the control point path calculated in the step S120 on the path display image, or may be configured not to superimpose on the path display image.

Figure 14:
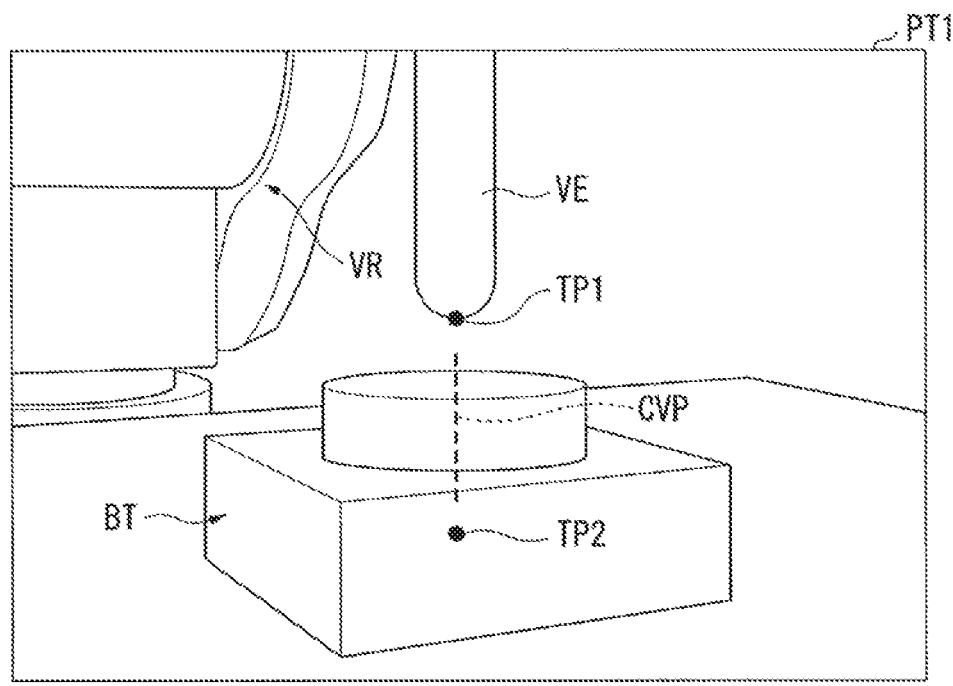
FIG. 14 is a view showing an example of an image in which a display controller displays a constant velocity section in step 150.

Here, FIG. 14 is a view showing an example of an image in which the display controller 469 displays the constant velocity section in the step S150. The image PT1 shown in FIG. 14 is an example of an area, among areas included in the path display image, in which a virtual space into which a work area where the robot 20 performs a work is virtually reproduced is displayed. In FIG. 14, as an example, a case where the work to be performed by the robot inspects the quality of button described above is described.

A button BT disposed in the virtual space displayed on the image PT1 is a virtual button, into which the target button to be inspected by the robot 20 is virtually reproduced. Also, a robot VR disposed in the virtual space displayed on the image PT1 is a virtual robot into which the robot 20 is virtually reproduced. An end effector VE disposed in the virtual space displayed on the image PT1 is a virtual end effector into which the end effector E is virtually reproduced. Also, a point TP1 disposed in the virtual space displayed on the image PT1 is the first teaching point. Also, a point TP2 disposed in the virtual space displayed on the image PT1 is the second teaching point. Then, a line CVP is an example of an image indicating the constant velocity section disposed in the virtual space displayed on the image PT1.

In the image PT1, by operating the robot control apparatus 40 through the information processing apparatus 50, a user can change the viewing direction in which the inside of the virtual space is viewed. Also, in the image PT1, by operating the robot control apparatus 40 through information processing apparatus 50, the user can change the viewing position from which the virtual space is viewed. In this way, the user can display the inside of the virtual space viewed from the desired position in the desired direction in the path display image.

Figure 15:
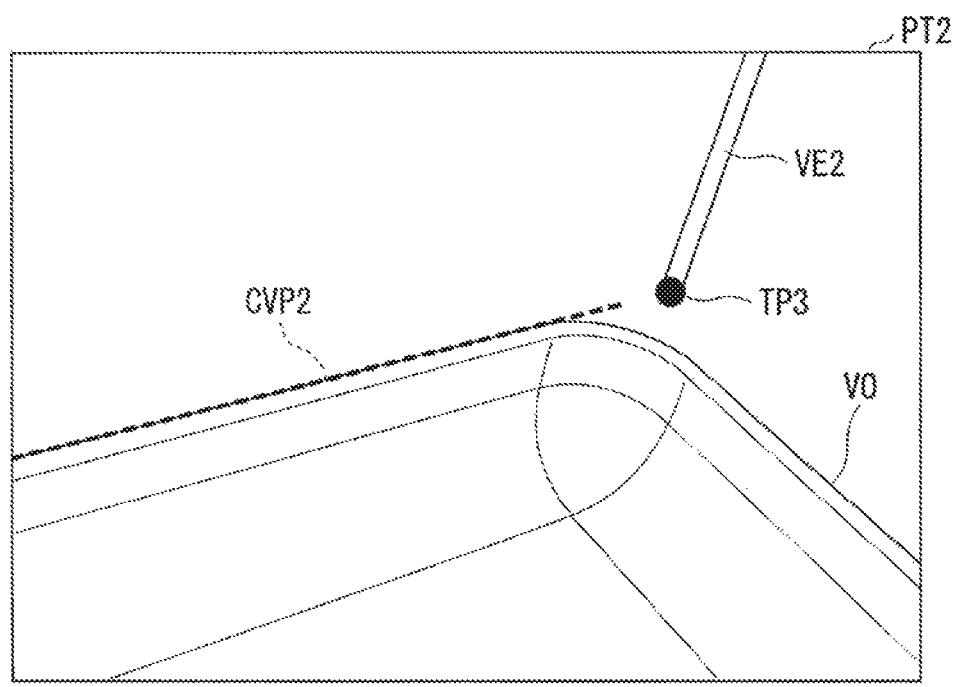
FIG. 15 is a view showing another example of an image in which the display controller displays a constant velocity section.

Also, FIG. 15 is a view showing another example of an image in which the display controller 469 displays the constant velocity section in the step S150. An image PT2 displayed in FIG. 15 is another example of an area, among the areas included in the path display image, in which a virtual space into which the work area where the robot 20 performs a work is virtually reproduced is displayed. In FIG. 15, as an example, a case in which the work to be performed by the robot 20 applies an ejection substance to a target object by a dispenser is described.

An object VO disposed in the virtual space displayed in the image PT2 is a virtual target object into which the target object to which an ejection substance is applied by the dispenser is virtually reproduced. Also, an end effector VE2 disposed in the virtual space displayed on the image PT 2 is a virtual end effector into which the end effector E provided with a dispenser is virtually reproduced. Also, a point TP3 disposed in the virtual space displayed on the image PT2 is the first teaching point. Then, a line CVP2 is an example of an image in which the constant velocity section disposed in the virtual space displayed on the image PT2 is shown.

In the image PT2, by operating the robot control apparatus 40 through the information processing apparatus 50, a user can change the viewing direction in which the inside of the virtual space is viewed. Also, in the image PT2, by operating the robot control apparatus 40 through the information processing apparatus 50, the user can change the view position from which the inside of the virtual space is viewed. In this way, the user can display the inside of the virtual space viewed from the desired position in the desired direction in the path display image.

By visually identifying the constant velocity section by the path display image displaying the virtual space as shown in FIGS. 14 and 15, a user can easily check in a short time whether or not the desired section in which the user wants the robot 20 to perform a work in the control point path is the constant velocity section. As a result, the user can teach the robot control apparatus 40 through information processing apparatus 50 with high accuracy.

Return to FIG. 13, after the processing of the step S150 is performed, the display controller 469 generates the path display image information indicating the path display image in which an image showing a constant velocity section is superimposed in the step S150 (step S160).

Next, the display controller 469 outputs the path display image information generated in the step S160 to the information processing apparatus 50, displays the path display image on which an image displaying the constant velocity section is superimposed in the step S150 to the display unit 55 of the information processing apparatus 50 (step S170) and ends the processing.

Figure 16:
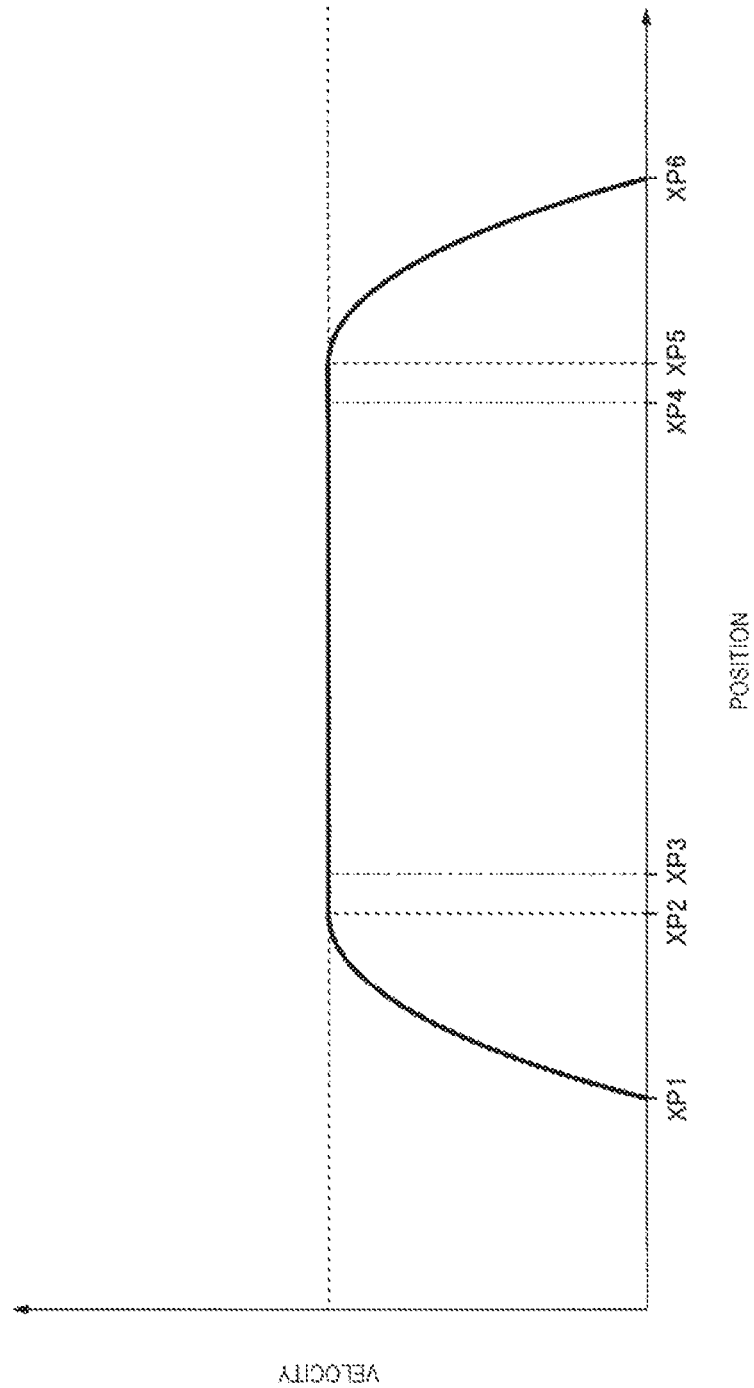
FIG. 16 is a graph showing a specific example change of velocity of a control point in a motion taught by a user based on a path display image.

Here, a specific example of a change in the velocity of the control point T in a motion the user has taught the robot control apparatus 40 based on the path display image will be described with reference to FIG. 16. FIG. 16 is a graph showing a specific example of a change in the velocity of the control point T in a motion the user has taught based on the path display image. FIG. 16 shows an example of a change in the velocity of the control point T while the control point T moves straight from the first teaching point to the second teaching point to simplify the description. The vertical axis of the graph shown in FIG. 16 indicates the velocity of the control point T, and the horizontal axis of the graph indicates the position of the control point T on a straight line on which the control point T moves.

In the example shown in FIG. 16, the robot control apparatus 40 causes the robot 20 to perform a work, while moving the control point T from a position XP1 which is an example of the position of the first teaching point to a position XP6 which is an example of the position of the second teaching point. Here, the position XP2 indicates the acceleration end position in the example. Also, the position XP5 indicates the deceleration start position in the example. The position XP3 shows an example of a position at which the robot control apparatus 40 causes the robot 20 to start a work. Also, the position XP4 shows an example of a position at which the robot control apparatus 40 causes the robot 20 to end the work.

That is, in the example shown in FIG. 16, the robot control apparatus 40 does not cause the robot 20 to start a work at the timing of the control point T reaching the acceleration end position which is the starting point of the constant velocity section but causes the robot 20 to start the work at the timing of the control point T reaching a position on the second teaching point side by a predetermined distance away from the acceleration end position. In this way, the robot control apparatus 40 can more reliably restrain the velocity of the control point T from changing due to an error or the like at the timing of causing the robot 20 to start the work. Also, in the example, the robot control apparatus 40 does not cause the robot 20 to end the work at the timing of the control point T reaching the deceleration start position which is the end point of the constant velocity section but causes the robot 20 to end the work at the timing of the control point T reaching a position on the first teaching point side by a predetermined distance away from the deceleration start position. In this way, the robot control apparatus 40 can more reliably restrain the velocity of the control point T from changing due to an error or the like at the timing of the causing the robot 20 to end the work.

The example shown in FIG. 16 is no more than an example. The robot control apparatus 40 may be configured to cause the robot 20 to start a work at the timing of the control point T reaching the acceleration end position. Also, the robot control apparatus 40 may be configured to cause the robot 20 to end a work at the timing of the control point T reaching the deceleration start position.

A part or whole of the functions of the robot control apparatus 40 described above may be provided in the information processing apparatus 50 or may be provided in both the robot control apparatus 40 and the information processing apparatus 50.

As described above, a control apparatus (control apparatus 30 in this example) controls a robot (robot 20 in this example) that performs a predetermined work on a target object by an end effector (end effector E in this example) provided in a robot arm and that includes a display controller (display controller 469 in this example) that outputs a display signal to display a first image (path display image in this example) which includes a first position (position of the first teaching point in this example) through which a predetermined taught portion of the end effector (position of a central axis of the end effector E in this example) passes through, a second position at which the taught work is started on the target object, and a third position (start position of lice CVP, for example, in the example described above) which is located between the first position and the second position and at which the velocity of the end effector with respect to the target object becomes constant. In this way, the control apparatus can improve either or both of accuracy and efficiency of the work that the robot is caused to perform.

Also, in the control apparatus, the display controller may be configured to superimpose the second image of the target object (virtual target object in this example) on the first image.

Also, in the control apparatus, the display controller may be configured to superimpose a line (image showing the constant velocity section in this example) drawn through the third position from the first position on the first image.

Also, the control apparatus includes a path calculator (path calculator 465 in this example) calculating a path (control point path in this example) of the control point (control point T in this example) of the robot in a continuous path control, and, based on a predetermined command (motion program in this example), the path calculator calculates either or both of the position (acceleration end position in this example) at which acceleration in the translational motion of the control point ends and the position (deceleration start position) at which the deceleration in the translational motion of the control point starts, in a path where the control point is moved from the first teaching point to the second teaching point by the continuous path control. In this way, the control apparatus can improve either or both of accuracy and efficiency of the work that the robot is caused to perform.

Also, the control apparatus may be configured such that the path calculator calculates either or both of the position and timing in which the acceleration of the control point ends in the translational motion (timing in which the control point T starts the translational motion) and the position and timing in which the deceleration of the control point starts in the translational motion (timing in which the control point T ends the translational motion).

Also, in the control apparatus, the path calculator may be configured to calculate either or both of the attitude in which the acceleration of the control point ends in the rotational motion and the attitude in which the deceleration of the control point starts in the rotational motion, in a path in which the control point is moved from the first teaching point to the second teaching point by the continuous path control, based on a predetermined command.

Also, the control apparatus may be configured such that the path calculator calculates either or both of the attitude or timing in which the acceleration of the control point ends in the rotational motion and the attitude or time in which the deceleration of the control point starts in the rotational motion.

Also, the control apparatus may be configured to include a display controller that generates the path display image in which the path generated by the path calculator is displayed and that superimposes the constant velocity section in which the control point moves at a constant velocity, among the sections included in the path calculated by the path calculator, on the path display image.

An embodiment of the present disclosure has been described with reference to the drawings, the specific configuration is not limited to this embodiment, and various modifications, substitutions, deletions, and the like may be made without departing from the spirit of this disclosure.

Also, a program for realizing the function of any component in the apparatus described above may be recorded on a computer readable recording medium, and the program may be read and executed in a computer system. The apparatus is the control apparatus 30, the robot control apparatus 40, the information processing apparatus 50, or the like. It should be noted that the computer system referred to here includes an OS (Operating System) and hardware such as a peripheral device. Also, the "computer readable recording medium" refers to a portable medium such as a flexible disk, a magneto-optical disk, a ROM, a CD (Compact Disk) ROM, and a storage device such as a hard disk built in a computer system. Further, the "computer readable recording medium" also includes a holder of a program for a certain period of time such as a volatile memory (RAM) inside a computer system that serves as a server or a client when a program is transmitted through a network such as the internet or a communication line such as a telephone line.

The program described above may be transmitted from a computer system in which the program is stored in a storage device or the like to another computer system through a transmission medium or by a transmission wave in the transmission medium. Here, the "transmission medium" transmitting the program is a medium having a function of transmitting information such as a network (communication network) such as the internet and communication line (communication line) such as a telephone line. Also, the program described above may be for realizing a part of the functions described above. Further, the program described above may be able to realize the functions described above in combination with a program already recorded in a computer system, that is, a so-called differential file, differential program, and the like.

What is claimed is:

1. A robot system comprising:
   a robot having a robot arm;
   a robot controller configured to move the robot arm based on a motion program stored in a memory;
   a display screen; and
   a display controller configured to generate and display a constant velocity area of a control point path for the robot arm,
   the motion program instructing the robot controller to move a control point on the robot arm along a control point path, accelerating the control point from an acceleration start point to an acceleration end point, and decelerating the control point from a deceleration start point to a deceleration end point, with a constant velocity area between the acceleration end point and the deceleration start point,
   the display controller being configured to generate the constant velocity area by determining the control point path from the motion program, calculate the acceleration end point and the deceleration start point along the control point path, determine the constant velocity area based on the acceleration end position and the deceleration start position, and
   the display controller being configured to display the constant velocity area by generating a path display image depicting the control point path, displaying the path display image on a display screen, and superimposing the constant velocity area on the path display image.

2. The robot system according to claim 1, wherein the display controller is configured to superimpose the path display image on an image of a target object stored in the memory.

3. The robot system according to claim 1, wherein the display controller is configured to determine the acceleration end point by calculating based on a position and attitude of a first teaching point stored in the memory, the velocity of the control point included the motion program and the acceleration of the control point included the motion program.

4. The robot system according to claim 2, wherein the display controller is configured to determine the acceleration end position by calculating based on a position and attitude of a first teaching point stored in the memory, the velocity of the control point included the motion program and the acceleration of the control point included the motion program.

* * * * *